July 28, 1959  P. L. REUTER ET AL  2,896,464
VARIABLE COMPUTING METHOD AND APPARATUS
Filed July 27, 1954  2 Sheets-Sheet 1
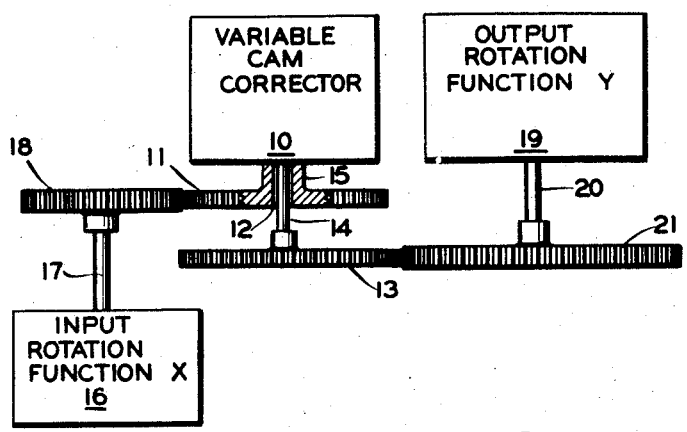
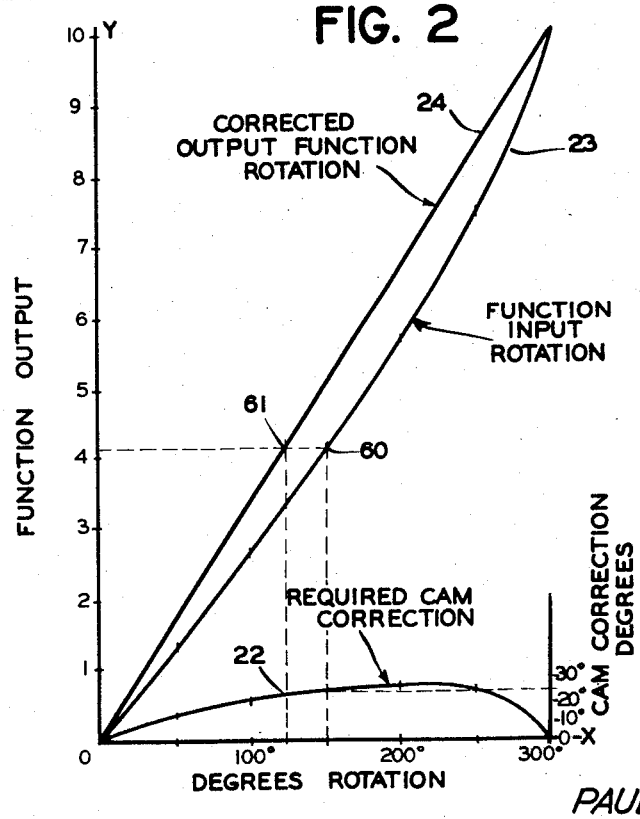
INVENTORS
PAUL L. REUTER
ERNEST WEISS
BY
ATTORNEY

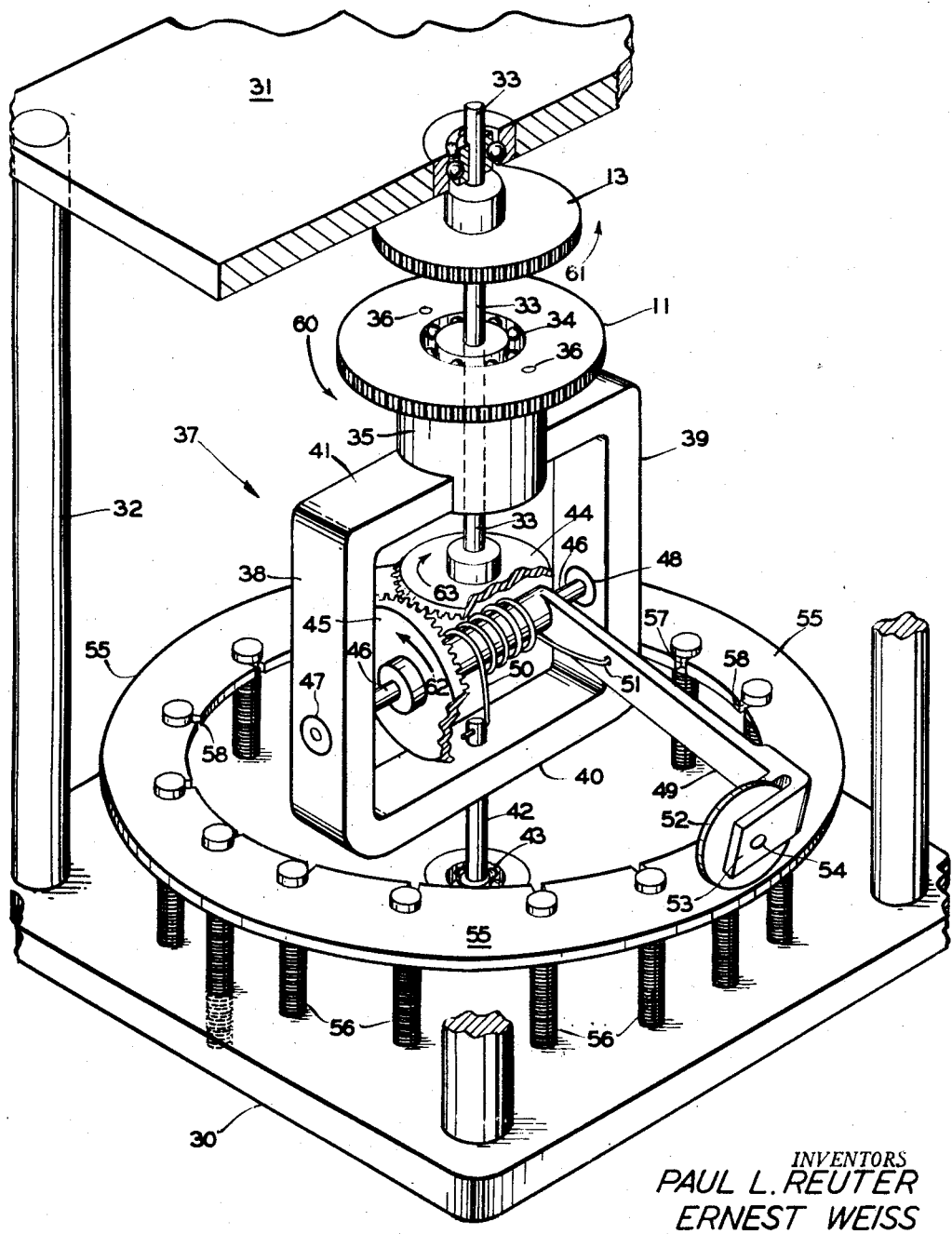

United States Patent Office 2,896,464
Patented July 28, 1959

2,896,464

VARIABLE COMPUTING METHOD AND APPARATUS

Paul Luther Reuter, Franklin Lakes, and Ernest Weiss, Maywood, N.J., assignors to Bendix Aviation Corporation, Teterboro, N.J., a corporation of Delaware Application July 27, 1954, Serial No. 446,032

1 Claim. (Cl. 74—394)

This invention relates to computers and more particularly to a method and means of providing a computer employing a variable cam correcting differential, which may be used for instrumentation in high performance aircraft.

In a copending patent application of Paul L. Reuter, Serial No. 440,395, filed June 30, 1954, for Computing Method and Apparatus, there is shown a computer utilizing one or more cam correcting differentials, with each of said differentials having one input and a corrected output, said corrected output being provided in part by a cam for modifying the output, as a function of the input. However, the device of said copending patent application employs a cam having a camming surface of prefixed contour, since cam correction desired in each case is known.

However, a cam correcting differential may be employed where the ultimate correction desired is not known, or the correction may require a change depending on variable factors, such as may be encountered in problems related to high speed aerodynamics. For example, when used with airspeed indicators having a diaphragm responsive to an air flight variable, the diaphragm cannot be manufactured with the high degree of accuracy required to follow the exact curvature of the required function as necessitated by use in high performance aircraft. Consequently, a variable cam corrector must be used to provide the high degree of accuracy required. Further, by using a variable cam corrector, it is not necessary to strive for high precision in production of the diaphragms since the variable cam corrector can be adjusted to meet the necessary requirements. The variable cam correcting differential has a multiplicity of applications with other devices having outputs which may require high precision adjustment.

As explained in the aforementioned copending patent application, the cam of cam correcting differential, as in the present invention, generates only the desired differential between the input and the output. Therefore, any error in the camming operation is proportional to the correction only.

In the computer of the present invention, equivalent mathematic computations are obtained by mechanical means which are comparatively very light in weight, small in size, have a minimum of moving parts, are more accurate, and yet extremely robust.

It is an object of the present invention to provide a novel method and means for computers.

Another object of the invention is to provide a novel computer incorporating mechanical differential and cam for solving equations in aerodynamics.

Another object is to provide a cam correcting differential having adjustment means for varying the curvature of the cam.

A further object of the invention is the provision of a novel means for the modification of a given mechanical rotation to a function of the given rotation and wherein a camming surface has adjustable means for varying the curvature thereof.

Another object of the invention is to provide a novel computer means which has a minimum of moving parts, is extremely light in weight, greatly reduces space requirements, is more efficient and is robust.

The present invention contemplates a mechanical computer for modifying an output of a unitary differential device in accordance with the contour of a cam which may be varied by one or more adjustment means. Therefore, it is possible to get a modified function in one of many forms as the output of a unitary differential device depending upon the contour of the camming surface as dictated by the particular function or results desired, whereby a novel differential includes means for a correction factor while using only one input to obtain a corrected output.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

Fig. 1 is a schematic showing a variable cam corrector having one input and one output coupled with an input rotation function "X" and an output rotation function "Y."

Fig. 2 embraces a set of curves for one form of the variable cam correcting differential.

Fig. 3 is an expanded view, partly broken away, of one form of the variable cam correcting differential.

Referring to the drawings and more particularly to Fig. 1, there is shown a schematic diagram, partially in block form, of a variable cam corrector, or variable cam correcting differential 10, having an input gear 11, with a hub 15 having a central bore 12, and an output gear 13 having a shaft 14 inserted through the bore 12 of hub 15.

The input rotation function "X" is shown as a block 16 having a shaft 17 with a gear 18 secured thereon, which gear is in mesh with the input gear 11 of the variable cam corrector. The output rotation function "Y" is shown by a block 19 having shaft 20 with a gear 21 secured thereon, with said gear being coupled to the output gear 13 of the variable cam corrector, or cam correcting differential.

Fig. 2 shows a set of curves demonstrating the operation of the variable cam correcting differential. Curve 23, bearing the legend, "Function Input Rotation," shows the input rotation plotted against the output function. Curve 24, bearing the legend, "Corrected Output Function Rotation," shows the output rotation desired. Curve 22, bearing the legend, "Required Cam Correction," shows the correction required from the cam surface to perform the conversion from curve 23 to curve 24. On the lower right side of Fig. 2 there are numerals adjacent the legend, "Cam Correction Degrees." This is the degrees correction required from the variable cam correcting differential as the degrees rotation appear on the output shaft.

To show a specific operation of the variable cam correcting differential using the curves shown in Fig. 2, assume a specific input rotation of 150 degrees corresponding to 4.125 on the function output and as specifically shown on the function input curve 23 by the point 60. The corresponding point on the desired output curve 24 for a 4.125 function output as indicated by the point 61 is at 125° input rotation. It is therefore obvious that to convert the point 60 on curve 23 to the point 61 on curve 24 for a common 4.125 function output, 25° must be subtracted from the input rotation. The required 25° subtraction is indicated on the required cam correction curve 22 at a point corresponding to 150° input rotation.

Referring to Fig. 3, there is shown a computer of the variable cam correcting differential type, and wherein the supporting structure consists of a base 30, plate 31, and a plurality of supporting rods 32, between the base and the plate for supporting the elements of the device.

An output shaft 33 is journaled in the plate 31 and has an output gear 13 secured thereon. The output shaft passes through a bearing assembly 34 in the gimbal hub 35, and the input gear 11, which gear is secured to said hub by means of pins 36. A gimbal frame 37, which functions like a differential gear, has left and right side portions, 38 and 39, with a lower portion and an upper portion, 40 and 41 respectively, to form a closed yoke unitary with the gimbal hub 35. A gimbal shaft 42 is secured to the lower portion 40 of the gimbal and is journaled by means of a bearing assembly 43, with the base 30. The lower end of the output shaft 33 has a differential gear 44 secured thereon and is in mesh with a control gear 45. The control gear 45 is secured to a shaft 46 which is journaled at points 47 and 48 in the opposing left and right side portions of the gimbal. Operatively positioning the shaft 46 is an elongated arm 49 which is secured to the shaft 46 so as to adjustably position the gear 45, in response to motion imparted to the arm 49 by the cam follower 52.

A spring 50 is a bias spring that has one end thereof secured to one end of the gimbal shaft 42, merely for purpose of anchoring same, with the other end of the spring secured to the elongated arm portion 49 at point 51, so that the cam follower 52, which is pivoted at point 54 to the bracket portion 53 of the arm 49 will be held against the upper surface of the variable cam 55.

A multiplicity of adjustment screws 56, are shown equidistantly spaced about the adjustable cam 55. Each screw has a head portion provided by an annular groove 57, which groove provides guide surfaces for engaging the upper and lower surface of the adjustable cam 55. For each of the adjustment screws 56, there is provided in the cam a slot 58 to permit the adjustment screws 56 to be inserted into threaded complemental portions in the base at their respective positions shown in the drawing. Each of the adjustment screws is threaded through the base 30 and projects beyond the lower surface to the base to permit external adjustment thereof. Each of the adjustment screws has some means provided, such as a receptacle for a socket wrench, to permit the adjustment screws to be rotated. Each of the adjustment screws is independently movable so that rotation thereof will apply pressure to the flexible variable cam to bend same into the desired shape, so that the camming surface may be positioned by manipulation of the various screws to give the desired contour to the cam. The cam follower may have substantially a knife edge about the periphery thereof.

In operation, when input rotation is applied to the input gear 11, the gimbal 37 will rotate accordingly. Assuming that we desire to obtain the same degrees output rotation as input rotation, the variable cam 55 would be flat so that there would be no vertical motion of the arm 49. Assuming the input rotation on gear 11 was counter-clockwise, or the direction of the arrow 60, the gimbal would also rotate counter-clockwise. Since there would be no vertical motion of the arm 49 on the flat camming surface, there would be no rotary motion of the control gear 45 on its shaft 46. As the gimbal frame rotates counter-clockwise, the differential gear 44 would also rotate counter-clockwise since it is coupled to the gimbal frame via the control gear 45 which is not being actuated by the cam follower due to the flat cam surface, and, consequently, the output gear 13 would rotate counter-clockwise in the direction of the arrow 61, and there would be output rotation equal to input rotation.

Now, assume that we adjust certain of the screws so that in the area of the cam follower the camming surface is elevated or moved upwardly.

Assuming that we again rotate the input gear 11 in a counter-clockwise direction, then when the cam follower moved over the elevated portion of the camming surface, the cam follower would move upward, thereby causing the control gear 45 to rotate in the direction of the arrow 62, which would in turn cause the differential gear 44 to move in a clockwise direction, as shown by arrow 63. Under these conditions, with the gimbal frame rotating counter-clockwise and the differential gear 44 rotating clockwise, the rotary effect would be subtractive and the output gear would have less degrees rotation than the input gear.

Now assume that the cam is adjusted so that there is a downward curvature of the cam in the area of the cam follower. As the gimbal frame rotates counter-clockwise, the outer end of the arm 49 would move downwardly as it responds to the cam follower action, and would cause the differential gear 44 to move in a counter-clockwise direction opposite to that shown by arrow 63. Since the gimbal 37 would be rotating in a counter-clockwise direction, the control gear 45 would move in a direction opposite to that shown by arrow 62, which rotation would be additive with the gimbal rotation to increase the rotation on the output gear 13, which would now have more degrees rotation than the input gear.

It is possible to utilize a differential mechanism combined with a cam for the modification of a given mechanical rotation to a function of the given rotation. By this arrangement, a unitary cam correcting differential is provided for continuously modifying the output as a function of the input. It is possible to convert rotational motion from log to linear, linear to log, log to square or cube, linear to square or cube, square or cube to linear or log, and many other combinations.

Devices employing cams normally are not capable of driving multi-rotation outputs without additional servo applications, whereas an adjustable cam correcting device as presented in the instant application will transfer adequate power to drive multi-rotation outputs, or outputs with load characteristics beyond the range of direct cam drive.

The computer shown in Fig. 3 functions mechanically as a differential device, in that a single input rotation is modified by a camming action provided by camming means which is adjustable to provide a single output rotation.

The unitary computer has means for providing a novel method of solving mathematical problems by mechanical means. Consequently, several mechanical computers of the adjustable cam corrector type shown herein may be employed to provide an airspeed computer for indicating Mach number, True Airspeed and other quantities as derived from air flight variable in the manner indicated in the aforementioned copending patent application of Paul L. Reuter.

The mechanical computer of the present application is a unitary device which utilizes an adjustment cam for generating a curve which is included in the functional operation of the device. Consequently, by means of the present mechanical computer, it is possible to continuously obtain the algebraic sum of the angular movements of certain components of the device. Accordingly, it is possible to generate from a straight line any curve by adding or subtracting various amounts relative to the reference line. Accordingly, a device which adds or subtracts various amounts as above indicated can be used to generate a desired curve.

The mechanical computer presented herein has camming means carried by a supporting structure having adjustment means accessible exteriorly of the supporting structure. The elongated arm 49 which is secured for unitary movement with the control gear is movable by a cam follower in engagement with a camming surface of the adjustable camming means. In accordance with the actuation of the cam follower, the control gear 45 is angularly displaced on its carrying shaft so that the motion of the output gear may be varied accordingly, to increase or decrease the output rotation. Each of the adjustment screws has an annular groove which fits into an opening in the cam and is free to be rotated. The opposed upper and lower surfaces of the groove provide limiting means for the camming surface. When all of the adjustment screws are properly positioned, they establish the curvature of the camming surface according to the curve, such as 22, to obtain the desired output rotation, such as shown on curve 24.

From the foregoing, it will be seen that the cam correcting differential with its variable cam provides a computer with an output function that is dependent upon the curvature of the camming surface. Consequently, input rotation function "X" may be applied to the input gear of the variable cam corrector, or variable cam correcting differential, and the output rotation, function "Y," may be obtained, said function "Y" being a modification of the input function "X."

Although but one embodiment of the invention has been illustrated and described in detail, various changes and modifications in the form and relative arrangement of parts which will now appear to those skilled in the art, may be made without departing from the scope of the invention.

What is claimed is:

A mechanical computer comprising a first gear and a second gear, a gimbal frame, a gimbal hub drivingly connecting the first gear to the gimbal frame, a third gear positioned within the gimbal frame, a shaft extending coaxially through the gimbal hub and drivingly connecting the third gear to the second gear, another shaft pivotally mounted within the gimbal frame and extending perpendicular to the first-mentioned shaft, a fourth gear and a control arm, said other shaft drivingly connecting said control arm to said fourth gear and positioning said fourth gear in driving engagement with said third gear, a flexible annular cam plate, said control arm having a free end portion, means biasing said free end portion of the arm into contacting relation with the annular cam plate, a base plate, a plurality of adjustable screws in operative engagement with said base and cam plates to vary the relative position of the cam plate, each of said screws being independently adjustable to flex the annular cam plate into a predetermined contour for cooperation with the free end of the control arm so as to impart upon rotation of the first gear a rotation to the second gear varying with the contour of the annular cam plate.

References Cited in the file of this patent

UNITED STATES PATENTS

| | | |
|---|---|---|
| 2,053,737 | Petschenig | Sept. 8, 1936 |
| 2,079,197 | Bergman | May 4, 1937 |
| 2,402,321 | Enger et al. | June 18, 1946 |
| 2,415,157 | Bedford | Feb. 4, 1947 |
| 2,595,591 | Lohutko | May 6, 1952 |
| 2,621,495 | Garbarini | Dec. 16, 1952 |

FOREIGN PATENTS

| | | |
|---|---|---|
| 392,646 | Germany | July 7, 1922 |

OTHER REFERENCES

Ser. No. 414,407, Scheppmann (A.P.C.) published May 4, 1943.